US011853546B2

(12) United States Patent
Lee et al.

(10) Patent No.: US 11,853,546 B2
(45) Date of Patent: Dec. 26, 2023

(54) ELECTRONIC DEVICE FOR CONTROLLING INPUT MODE ACCORDING TO FOLDING ANGLE, AND METHOD THEREFOR

(71) Applicant: Samsung Electronics Co., Ltd., Suwon-si (KR)

(72) Inventors: Gijae Lee, Suwon-si (KR); Jebin Lee, Suwon-si (KR); Sunggu Kim, Suwon-si (KR); Jiyoung Kim, Suwon-si (KR); Daehee Cho, Suwon-si (KR); Hoon Choi, Suwon-si (KR); Bumryong Hong, Suwon-si (KR); Pilwon Seo, Suwon-si (KR); Jiwoo Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/163,943

(22) Filed: Feb. 3, 2023

(65) Prior Publication Data

US 2023/0185449 A1 Jun. 15, 2023

Related U.S. Application Data

(63) Continuation of application No. PCT/KR2021/010045, filed on Aug. 2, 2021.

(30) Foreign Application Priority Data

Aug. 3, 2020 (KR) .................. 10-2020-0097053

(51) Int. Cl.
*G06F 3/04886* (2022.01)
*G06F 1/16* (2006.01)

(52) U.S. Cl.
CPC ........ *G06F 3/04886* (2013.01); *G06F 1/1618* (2013.01); *G06F 1/1643* (2013.01); *G06F 1/1683* (2013.01)

(58) Field of Classification Search
CPC .. G06F 3/04886; G06F 1/1618; G06F 1/1643; G06F 1/1683
See application file for complete search history.

(56) References Cited

U.S. PATENT DOCUMENTS 9,167,711 B2 * 10/2015 Lee ...................... G06F 1/1618
9,377,811 B2 6/2016 Im
(Continued)

FOREIGN PATENT DOCUMENTS

JP 2013069203 A 4/2013
JP 6055049 B1 12/2016
(Continued)

OTHER PUBLICATIONS

International Search Report and Written Opinion for International Application No. PCT/KR2021/010045; International Filing Date Aug. 2, 2021; dated Dec. 1, 2021; 9 Pages.

*Primary Examiner* — Michael Pervan
(74) *Attorney, Agent, or Firm* — CANTOR COLBURN LLP

(57) ABSTRACT

At least one processor included in an electronic device can acquire first motion data about the motion of the electronic device through at least one motion sensor, acquire second motion data about a motion of an external device through a connector included in the electronic device, determine, on the basis of the first motion data and the second motion data, the folding angle between the electronic device and the external device connected to the electronic device, and determine, on the basis of the determined folding angle, an input mode that sets whether to display a user interface on a display or whether to block an input signal received through the connector. Various other embodiments identified through the specification are possible.

20 Claims, 15 Drawing Sheets

(56) References Cited

U.S. PATENT DOCUMENTS

| | | | |
|---|---|---|---|
| 9,794,380 B2 | 10/2017 | Kim et al. | |
| 9,952,628 B2* | 4/2018 | Lee | G06F 1/1626 |
| 10,488,883 B2 | 11/2019 | Rothkopf | |
| 10,564,677 B2* | 2/2020 | Lee | H05K 7/02 |
| 10,719,105 B2 | 7/2020 | Seo et al. | |
| 10,948,948 B2* | 3/2021 | Lee | G06F 1/1601 |
| 2012/0299813 A1 | 11/2012 | Kang et al. | |
| 2013/0170126 A1* | 7/2013 | Lee | G06F 1/1632 |
| | | | 361/810 |
| 2014/0083883 A1 | 3/2014 | Elias | |
| 2014/0122912 A1 | 5/2014 | Andou et al. | |
| 2014/0379942 A1 | 12/2014 | Perek et al. | |
| 2015/0370341 A1 | 12/2015 | Kang et al. | |
| 2016/0026221 A1* | 1/2016 | Lee | G06F 1/1654 |
| | | | 361/679.29 |
| 2016/0085319 A1 | 3/2016 | Kim et al. | |
| 2016/0141809 A1 | 5/2016 | Choi | |
| 2018/0136697 A1* | 5/2018 | Lee | H04M 1/0254 |
| 2018/0210509 A1 | 7/2018 | Jabori et al. | |
| 2019/0384362 A1 | 12/2019 | Xing | |
| 2020/0183458 A1* | 6/2020 | Lee | G06F 1/1632 |

FOREIGN PATENT DOCUMENTS

| | | |
|---|---|---|
| JP | 2017033116 A | 2/2017 |
| JP | 6622871 B1 | 12/2019 |
| KR | 20130071204 A | 6/2013 |
| KR | 20160033507 A | 3/2016 |
| KR | 20160059270 A | 5/2016 |
| KR | 20190011456 A | 2/2019 |

\* cited by examiner

ELECTRONIC DEVICE FOR CONTROLLING INPUT MODE ACCORDING TO FOLDING ANGLE, AND METHOD THEREFOR

CROSS-REFERENCE TO RELATED APPLICATIONS

This application is a continuation of International Application No. PCT/KR2021/010045 designating the United States, filed on Aug. 2, 2021, in the Korean Intellectual Property Receiving Office and claiming priority to Korean Patent Application No. 10-2020-0097053, filed on Aug. 3, 2020, in the Korean Intellectual Property Office, the disclosures of which are incorporated by reference herein in their entireties.

BACKGROUND

Field

Embodiments disclosed herein relate to a method for controlling an input signal from an external device according to a folding angle by a processor of an electronic device.

Description of Related Art

Recently, most electronic devices are provided with a touch screen such that input and outputs can be performed simultaneously through a large screen, in view of user convenience.

Portable electronic devices perform functions similar to those of laptop PCs, in addition to functions of terminals, as portable electronic devices are becoming larger and universally include touchscreen displays, as described above.

Peripheral devices of electronic devices have also been developed in line with the development of electronic devices. For example, separate keyboards are connected to electronic devices and are used to improve usability in an increasing number of cases, as in the case of laptop PCs including keyboards.

As separate keyboards are connected to electronic devices and used in an increasing number of cases, there is a need for a scheme for improving the usability of the separate keyboards.

In a back flip mode in which an electronic device is fully folded with regard to an external device including a keyboard and then used, a mode for blocking the user's input through the keyboard may be activated. However, there is a problem in that, when the electronic device is unfolded with regard to the external device including the keyboard in the back flip mode, an input inadvertently made by the user may be acquired during the unfolding process, thereby degrading usability.

SUMMARY

Various embodiments of the disclosure may provide an electronic device and an electronic device control method wherein, when a back flip mode in which the electronic device is fully folded with regard to an external device including a keyboard and then used is released, the user's inadvertent inputs acquired through the keyboard are blocked, thereby providing improved usability.

An electronic device according to an embodiment disclosed in the document may include a display, at least one motion sensor configured to detect motion of the electronic device, a coupling device coupled to an external device to be rotatable with respect to the electronic device, a connector connected to the external device to transmit a signal to the external device or receive a signal from the external device as the electronic device is coupled to the external device, and at least one processor operatively connected to the display, the at least one motion sensor, and the connector. The at least one processor may be configured to obtain first motion data on motion of the electronic device through the at least one motion sensor, obtain second motion data on motion of the external device through the connector, determine a folding angle between the electronic device and the external device based on the first motion data and the second motion data, and determine an input mode for setting whether to display a user interface on the display or whether to block an input signal received through the connector based on the determined folding angle.

In addition, a method for operating an electronic device according to an embodiment disclosed in the document may include obtaining first motion data on motion of the electronic device through at least one motion sensor, obtaining second motion data on motion of an external device through a connector, determining a folding angle between the electronic device and the external device based on the first motion data and the second motion data, and determining an input mode for setting whether to display a user interface on the display or whether to block an input signal received through the connector based on the determined folding angle.

According to various embodiments disclosed herein, when the folding angle between an electronic device and an external device belongs to a specific angle range, the electronic device may not receive unnecessary keyboard inputs.

In addition, according to various embodiments, operational errors of the electronic device may be prevented because the electronic device does not receive unnecessary keyboard inputs.

In addition, according to various embodiments, the user may be provided with improved usability. Various other advantageous effects identified explicitly or implicitly through the disclosure may be provided.

DETAILED DESCRIPTION

Hereinafter, various embodiments in the document will be described with reference to the accompanying drawings. However, it should be understood that there is no intent to limit a specific embodiment in the document, and the disclosure includes various modifications, equivalents, and/or alternatives of the embodiments of the disclosure.

Figure 1A:
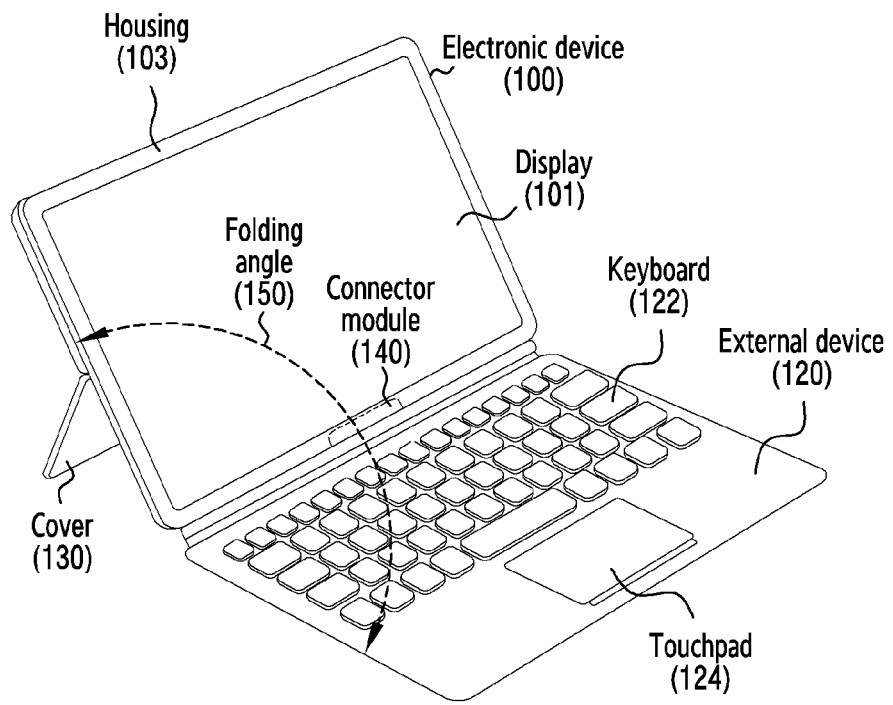
FIG. 1A is a perspective view of an electronic device according to an embodiment.
Figure 1B:
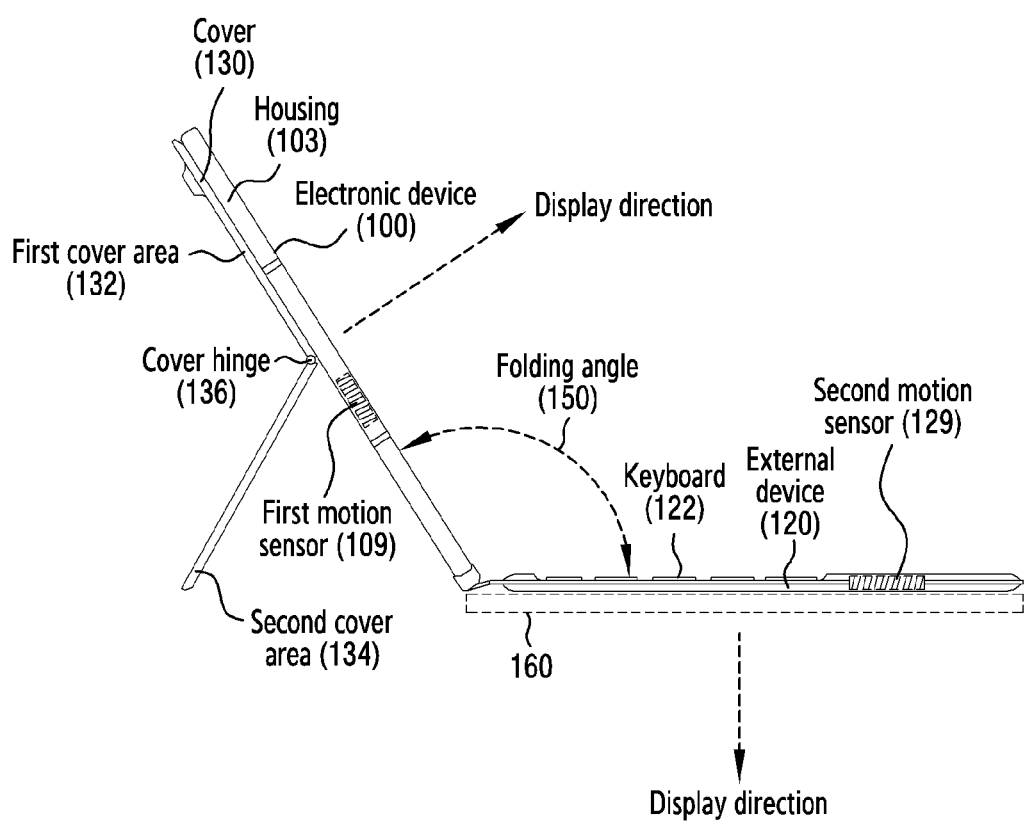
FIG. 1B is a side view of an electronic device according to an embodiment.

FIG. 1A is a perspective view of an electronic device 100 according to an embodiment. FIG. 1B is a side view of an electronic device 100 according to an embodiment.

Referring to FIG. 1A and FIG. 1B, in an embodiment, an electronic device 100 may include a display 101, a housing 103, a first motion sensor 109, and a connector module 140. The electronic device 100 may include a cover 130 on the rear surface of the electronic device 100.

In an embodiment, the housing 103 may form or support at least one surface of the electronic device 100 and may be configured to surround the electronic device 100. For example, the housing 103 may form a side surface and/or a rear surface of the electronic device 100. The housing 103 may be configured integrally with the side surface and the rear surface of the electronic device 100. Since a display may be disposed on one side (e.g., the front surface) of the electronic device 100, the housing 103 may be omitted from the front surface of the electronic device 100 or the housing 103 may be configured on a part of the perimeter portion of the front surface.

In an embodiment, the electronic device 100 may include the display 101. The display 101 may be attached to one surface of the electronic device 100 in a shape in which the display 101 is surrounded by a portion of the housing 103. The display 101 may include a flat-surface display or a curved-surface display having a predetermined curvature. The electronic device 100 may be configured such that the area of a bezel disposed about the display 101 is minimized on at least one surface of the electronic device and thus in some cases the display 101 can occupy most of the one surface of the electronic device.

In an embodiment, the electronic device 100 may have a cover 130 attached to one surface (e.g., the rear surface) of the electronic device 100, and one surface (e.g., the rear surface) of the electronic device 100 may be protected from an external impact by the cover 130. Methods, in which a first cover area 132 and a second cover area 134 of the cover 130 are attached to one surface (e.g., the rear surface) of the electronic device 100, may differ. For example, the first cover area 132 may be attached to one side (e.g., the rear surface) of the electronic device 100 by a permanent magnet and/or an adhesive tape, and the second cover area 134 may be attached to one surface (e.g., rear surface) of the electronic device 100 by a permanent magnet.

In an embodiment, the cover 130 may include the first cover area 132 and the second cover area 134 with reference to a cover hinge 136 (see FIG. 1B), and the first cover area 132 and the second cover area 134 may be rotatably coupled while forming a specific angle with reference to the cover hinge 136. For example, in a state where the first cover area 132 is attached to the rear surface of the electronic device 100, the second cover area 134 may rotate by a predetermined angle with respect to the first cover area 132 with reference to or about the cover hinge 136. In a state where the second cover area 134 rotates by the predetermined angle, one end of the second cover area 134 may come into contact with another object such as the ground or a desk in order to fix the electronic device 100 at a specific angle. One end of the second cover area 134 may be connected to or be in contact with at least one surface (e.g., an outer surface of the external device 120) of an external device 120 including a keyboard 122.

In an embodiment, referring to FIG. 1A and FIG. 1B, although the cover 130 including a uniaxial hinge structure is illustrated, the cover 130 may include a multi-joint hinge structure other than the uniaxial hinge structure. Besides, the cover 130 may include various structures which allow rotation of the first cover area 132 and the second cover area 134.

In an embodiment, the cover hinge 136 may be omitted from the cover 130. The first cover area 132 and the second cover area 134 may be connected by a flexible member, and thus the first cover area 132 and the second cover area 134 may be rotatably coupled to each other without a hinge structure. For another example, the area, in which the first cover area 132 and the second cover area 134 are connected, may be configured to be thinner than the thickness of the first cover area 132 and/or the second cover area 134, and thus the first cover area 132 and the second cover area 134 may be rotatably coupled to each other even without a hinge.

In an embodiment, the external device 120 may include the keyboard 122, a touchpad 124, and a second motion sensor 129. The keyboard 122 and the touchpad 124 may be configured on one surface of the external device 120 in order to obtain or receive a user input.

In an embodiment, a cushion cover may be included in at least a partial area of one surface (e.g., the surface on which the keyboard 122 is disposed) of the external device 120 to minimize an impact generated when the electronic device 100 and the external device 120 are folded.

Figure 1C:
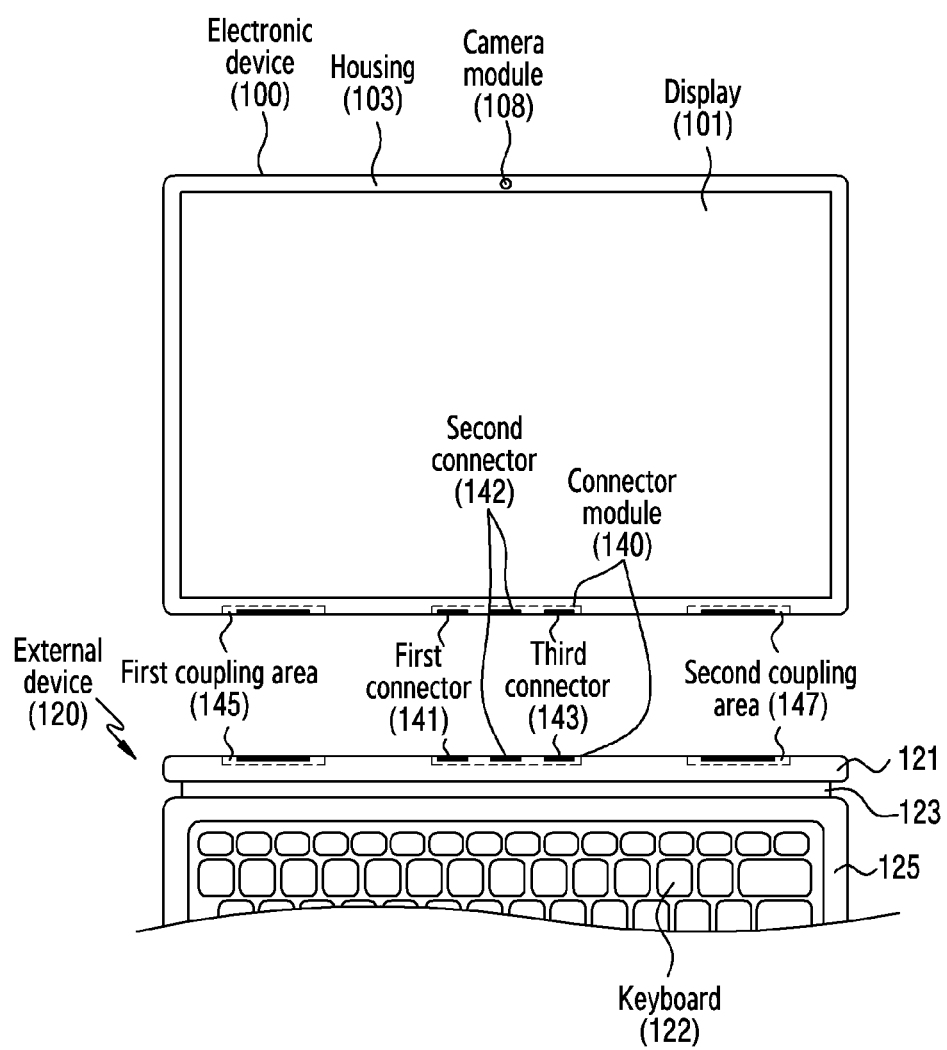
FIG. 1C shows an electronic device according to an embodiment and a part of an external device in a view from the front.

FIG. 1C shows an electronic device 100 according to an embodiment and a part of an external device 120 in a view from the front.

In an embodiment, the electronic device 100 may include a camera module 108. The camera module 108 may be included in the housing or may be provided under the display 101. That the camera module 108 is provided under the display 101 may be understood as the camera module is disposed under the display 101 so that the camera module 108 and the display 101 at least partially overlap when the display 101 is seen from the front. The camera module 108 may include an image sensor and an image signal processor (ISP). The electronic device 100 may take a picture of a user who uses the electronic device 100 through the camera module 108, and although not illustrated in drawings, the electronic device 100 may take a picture and take a video through a rear camera, and may also take a picture of a user. In addition, the electronic device 100 may provide, to a user, functions such as a video chat or a video conference through the display 101 and the camera module 108.

In an embodiment, each of the electronic device 100 and the external device 120 may include a first coupling area 145 and a second coupling area 147. Magnets, which allow the electronic device 100 and the external device 120 to be attached to each other or to be detached from each other, may be mounted in the first coupling area 145 and the second coupling area 147. According to an embodiment, for example, a user may physically couple or separate the external device 120 to or from one side surface of the electronic device 100 through the first coupling area 145 and the second coupling area 147.

In an embodiment, each of the electronic device 100 and the external device 120 may include a connector module. For example, the connector module 140 may be a 3 pin POGO or spring-loaded connector. The connector module 140 may include a first connector 141, a second connector 142, and a third connector 143. For example, the first connector 141 may function as a ground between the electronic device 100 and the external device 120. The electronic device 100 may exchange a data communication signal (e.g., a UART signal) with the external device 120 through the second connector 142. For example, in a state where the electronic device 100 and the external device 120 are physically and/or electrically coupled through the connector module 140, a user input and/or motion data obtained from the second motion sensor 129 may be delivered to the electronic device 100 through the second connector 142. The user input may be a user input through the keyboard 122 or the touchpad 124. The motion data may be referred to as sensor data. In the following description, the same is applicable. The third connector 143 may be a connector configured to apply power to the external device 120 from the electronic device 100. The external device 120 may not have its own power supply module (e.g., a battery) and thus may receive power through the third connector 143 when a power source of the electronic device 100 is turned ON.

In an embodiment, the external device 120 may include a coupling housing 121 including the first and second coupling areas 145 and 147 and the connector module 140, a coupling area 123, and an area 125 in which a keyboard 122 is disposed. The coupling area 123 may connect the coupling housing 121 and the area 125 in which the keyboard 122 is disposed. The coupling area 123 may be configured by a flexible member to maintain the connection between the electronic device and the external device even at various folding angles between the electronic device 100 and the external device 120.

Figure 2:
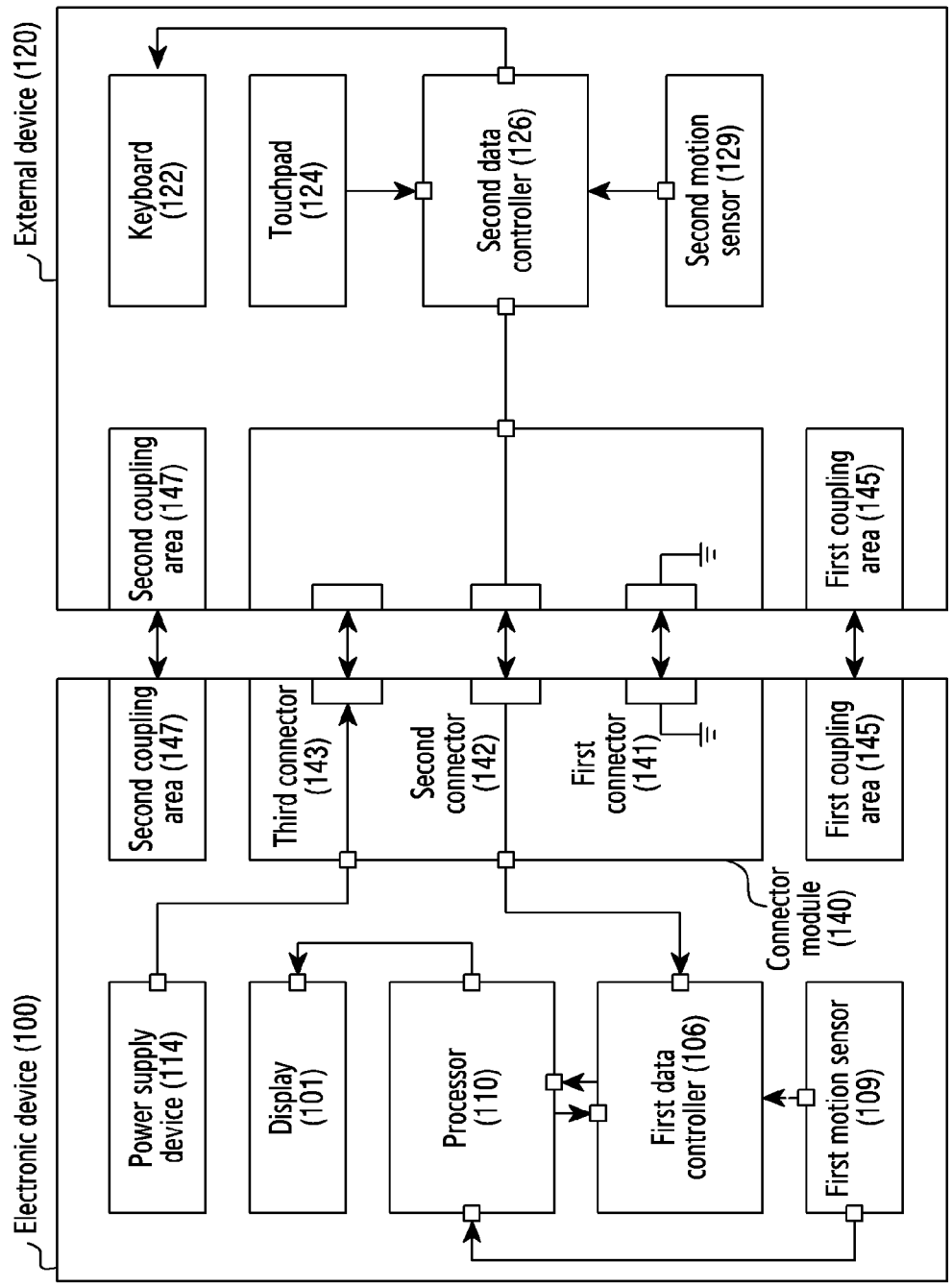
FIG. 2 shows main hardware configurations of an electronic device according to an embodiment and an external device.

FIG. 2 shows main hardware configurations of the electronic device 100 according to an embodiment and the external device 120.

In an embodiment, the electronic device 100 may include a power supply device 114, the display 101, a processor 110, a first data controller 106, the first motion sensor 109, and the connector module 140. The connector module 140 may be a POGO or spring-loaded connector. The connector module 140 may include the first connector 141, the second connector 142, and the third connector 143. The external device 120 may include the keyboard 122, the touchpad 124, a second data controller 126, and the second motion sensor 129. The first data controller may be referred to as a first data communication circuit or as a first micro controller unit (MCU). The second data controller may be referred to as a second data communication circuit or as a second micro controller unit (MCU).

FIG. 2 is a view for explaining hardware configurations of an electronic device 100 according to an embodiment and an external device 120. Elements of the electronic device 100 and the external device 120 may be replaced with other elements, and may be configured as one element in which functions of multiple elements are integrated. For example, as illustrated in FIG. 2, the electronic device 100 may include the processor 110 including a central processing unit (CPU) and the first data controller 106 including an MCU. For another example, the electronic device 100 may include one CPU configured to perform the functions of the processor 110 and the first data controller 106.

In an embodiment, the first motion sensor 109 and the second motion sensor 129 may receive (x1, y1, z1) motion data and (x2, y2, z2) motion data through a 3-axis sensor (e.g., an acceleration sensor). The electronic device 100 and/or the external device 120 may include the first motion sensor (e.g., an acceleration sensor) 109 and the second motion sensor (e.g., an acceleration sensor) 129, and additionally, may further include a gyro sensor and a geomagnetic sensor. In other words, the electronic device 100 and/or external device 120 may include an acceleration sensor, a gyro sensor, and a geomagnetic sensor to constitute a 9-axis sensor (or what is effectively a 9-axis sensor).

In an embodiment, the electronic device 100 may include the 9-axis sensor, and the external device 120 may include a 6-axis sensor. For example, the external device 120 may include an acceleration sensor and a gyro sensor to constitute a 6-axis sensor (or what is effectively a 6-axis sensor).

In an embodiment, the electronic device 100 may be configured to measure not only a folding angle between the electronic device 100 and the external device 120 but also the azimuth, the pitch, and the roll value of the electronic device 100 through motion data obtained from the sensors and to thus determine a mounting state of the electronic device 100.

In an embodiment, the keyboard 122 may provide an interrupt signal to the second data controller 126 in case a user input is obtained. The touchpad 124 may provide an interrupt signal to the second data controller 126 in case a user input is obtained. In addition, in case an impact of a predetermined strength or more is applied to the electronic device 100 or a folding gesture (or an unfolding gesture), in which a folding angle changes more than a designated critical angle (e.g., about 80°, is detected, an interrupt signal may be provided to the second data controller 126. The second motion sensor 129 may provide motion data on motion of the external device 120 to the second data controller 126 in response to the interrupt signal. The second data controller 126 may provide the interrupt signals and motion data to the first data controller 106 through the second connector 142. The interrupt signal may be generated when an impact of a predetermined strength or more is applied to the electronic device 100 or when the processor 110 receives an input through the keyboard 122 and/or the touchpad 124. In addition, the interrupt signal may be generated when a folding gesture (or an unfolding gesture) of a designated critical angle (e.g., about 80°) or more is detected. For example, the interrupt signal may be generated when the processor 110 or the first data controller 106 detects that a folding angle changes from about 0° to about 90° (that is, folding (unfolding) of about 80° or more) or that a folding angle changes from about 130° to about 350° (that is, a folding (or unfolding) of about 80° or more).

In the disclosure, folding and unfolding may be equally used without division in an operation in which a folding angle of the electronic device 100 changes.

In an embodiment, the electronic device 100 may be electrically or operatively connected to the external device 120 through the connector module 140. The electronic device 100 may transmit a data communication signal (e.g., a UART signal) to the external device 120 or may receive a data communication signal from the external device 120, through the second connector 142. The electronic device 100 may obtain device connection information such as the type (e.g., ID information) of the external device 120 through the connector module 140.

In an embodiment, the power supply device 114 may be electrically connected to the first connector 141. The electronic device 100 may apply power of the power supply device 114 to the external device 120 through the first connector 141.

In an embodiment, the electronic device 100 may include a touch panel above the display 101 and may receive a user input (e.g., a touch input by the hand of a user) through the touch panel. The electronic device 100 may include a digitizer panel under the display 101 and may receive a user input (e.g., a stylus pen input) through the digitizer panel.

In an embodiment, the processor 110 may control the display 101. The processor 110 may control power of the display 101 or control a user interface of the display 101. For example, the processor 110 may determine whether to display a user interface on the display 101 according to the folding angle between the electronic device 100 and the external device 120. In addition, the processor 110 may control whether to turn on/off the display 101. Some hardware will be described through FIG. 3A, FIG. 3B, and FIG. 3C below.

Figure 3A:
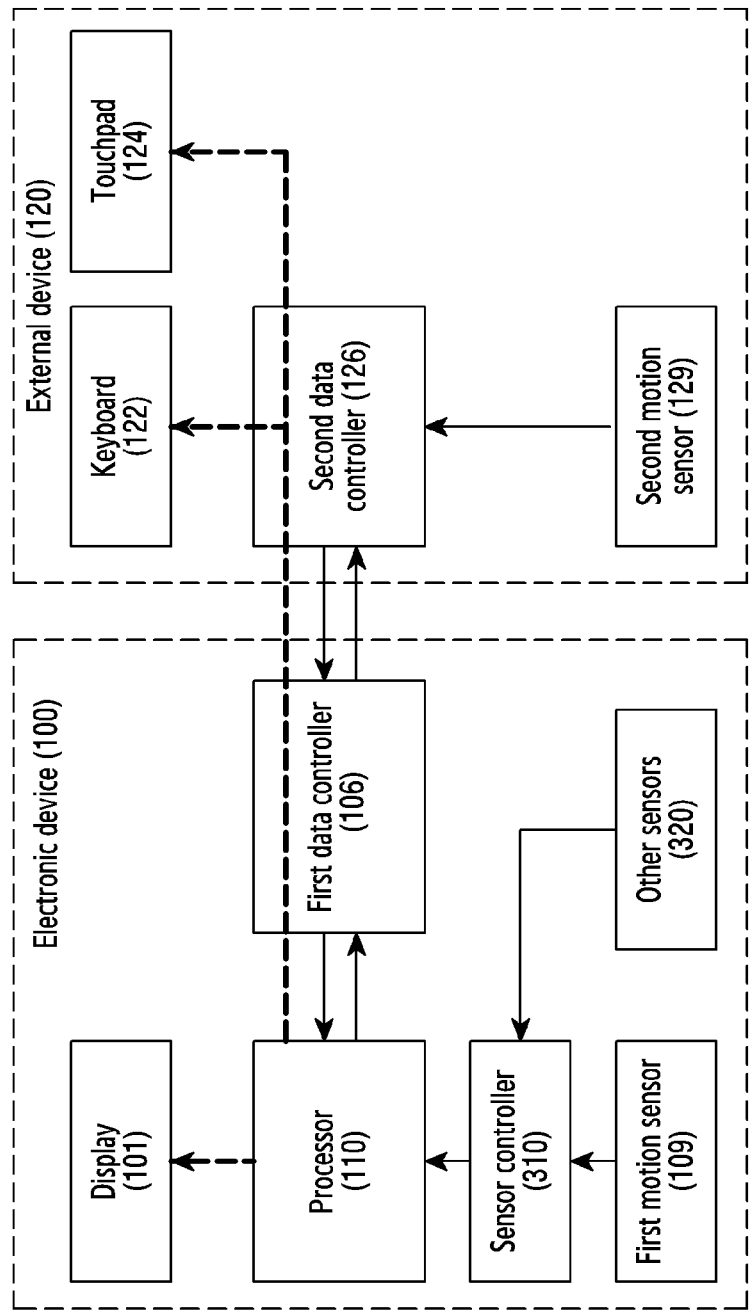
FIG. 3A shows a case in which a processor according to an embodiment controls an input mode of an electronic device and an input mode of an external device.
Figure 3B:
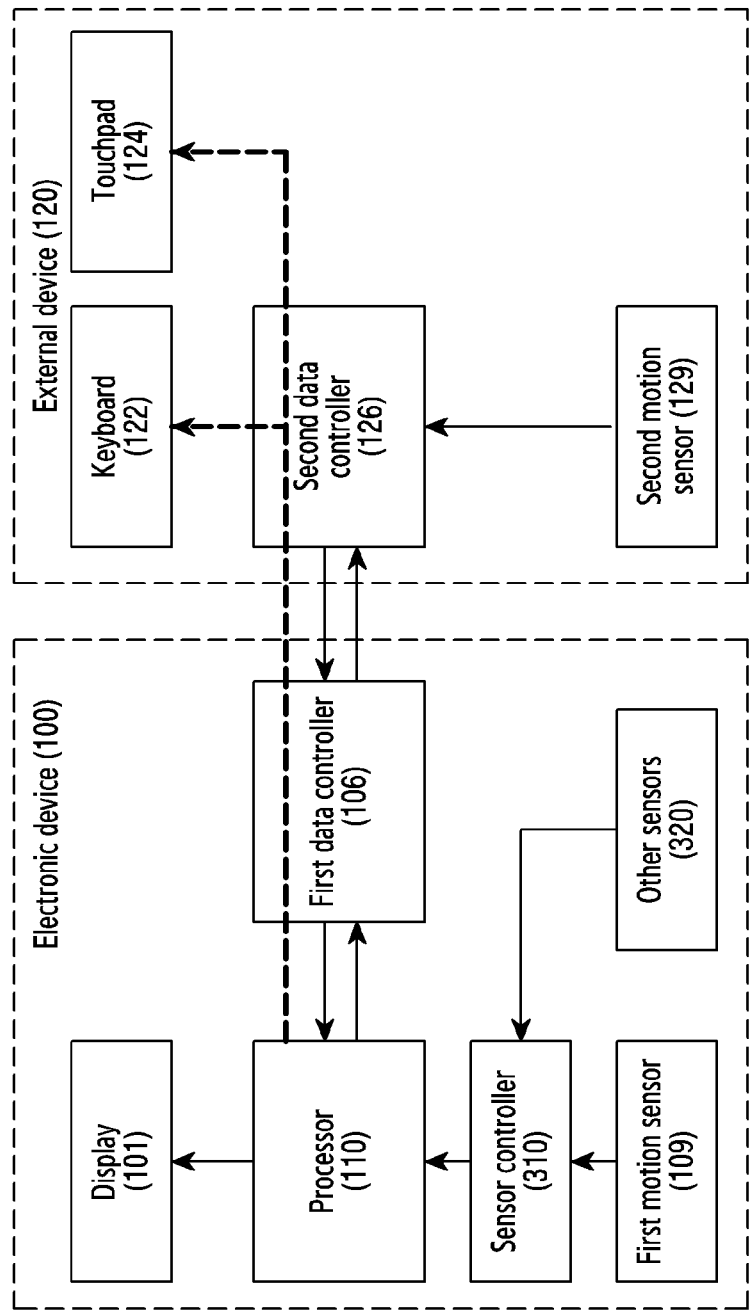
FIG. 3B shows a case in which a processor according to an embodiment controls an input mode of an external device.
Figure 3C:
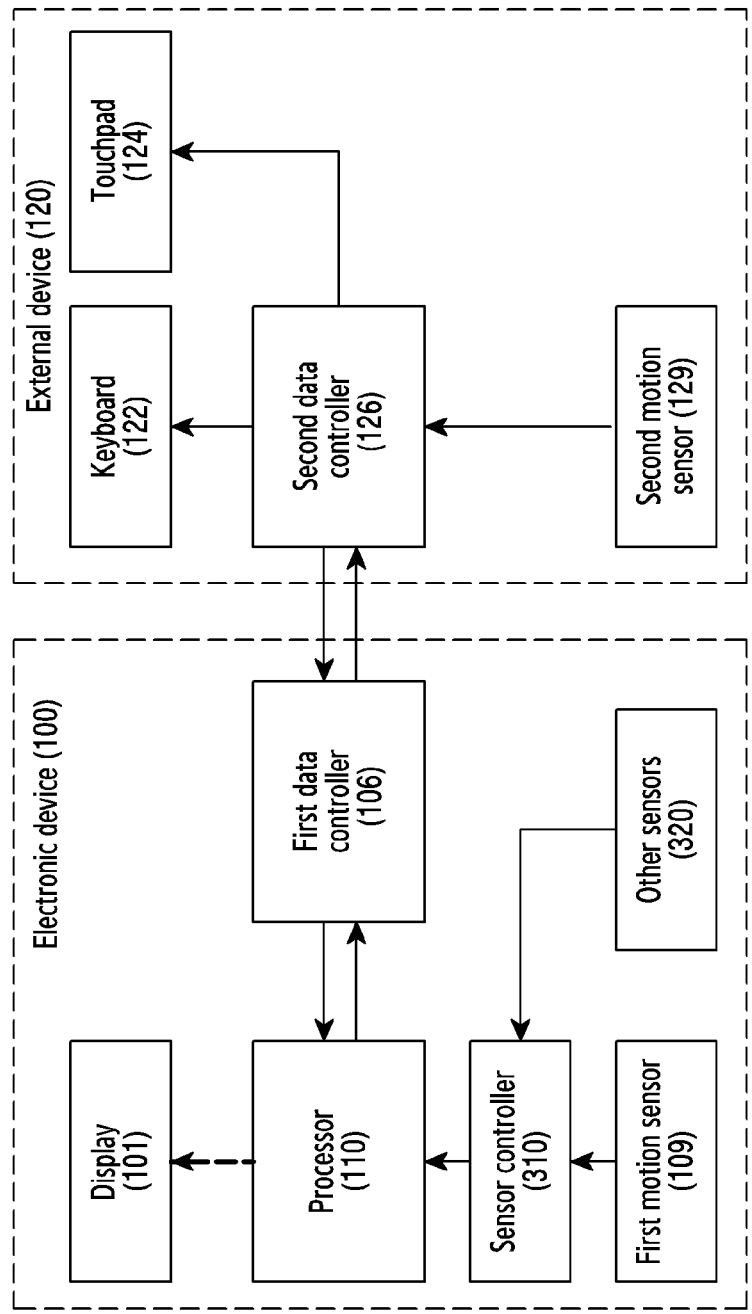
FIG. 3C shows a case in which a processor according to an embodiment controls an input mode of an electronic device.

FIG. 3A shows a case in which the processor 110 according to an embodiment controls an input mode of the electronic device 100 and a first input mode of the external device 120. FIG. 3B shows a case in which the processor 110 according to an embodiment controls a second input mode of the external device 120. FIG. 3C shows a case in which the processor 110 according to an embodiment controls a third input mode of the electronic device 100.

In an embodiment, the first motion sensor 109 may obtain motion data related to motion of the electronic device 100. The second motion sensor 129 may obtain motion data related to motion of the external device 120. The first motion sensor 109 and the second motion sensor 129 may receive (x1, y1, z1) motion data through a 3-axis sensor (e.g., an acceleration sensor).

In an embodiment, the electronic device 100 may include a sensor controller (e.g., a sensor hub) 310 capable of controlling the first motion sensor 109 and other sensors 320. The other sensors 320 may additionally include a hole sensor capable of identifying an open/closed state of an external device (e.g., a book cover) with respect to the electronic device 100 as well as the 9-axis sensor.

In an embodiment, the processor 110 may obtain first motion data on the first motion sensor 109 through the sensor controller 310. The first motion data may include three-axis motion information (x1, y1, z1) or nine-axis motion information obtained using a gyro sensor and a geomagnetic sensor.

In an embodiment, the first data controller 106 may request scan information on a motion sensor from the processor 110 and the second data controller 126. The first data controller 106 may request motion data from the processor 110 and the second data controller 126 in order to determine a folding angle between the electronic device 100 and the external device 120. For example, in at least one of: a case of receiving an input through the keyboard 122, a case of receiving an input through the touchpad 124, and a case of an impact of a predetermined strength or more is applied thereto, the first data controller 106 may request motion data from the processor 110 and the second data controller 126. In addition, in case it is detected through a motion sensor (e.g., a Hall sensor) that a mounting state between the electronic device 100 and the external device 120 is an open state (e.g., a folding angle is 30° to about 240°), the first data controller 106 may request motion data from the processor 110 and the second data controller 126. The processor 110 may obtain a magnetic field signal (e.g., a high output) as the mounting state becomes the open state, and may determine the mounting state through the magnetic field signal (e.g., a high output).

In an embodiment, the first data controller 106 and the second data controller 126 may perform data (e.g., serial data) communication according to a designated communication standard. The first data controller 106 and the second data controller 126 may perform serial data communication capable of simultaneously receiving, through single channel communication, an input through the keyboard 122, an input though the touchpad 124, and motion data. For example, in case a user touch input is detected, the first data controller 106 may receive serial data together with motion data.

In an embodiment, the processor 110 may request the first motion data from the first motion sensor 109 in response to the request of the first data controller 106 and may obtain the first motion data. The first motion data may include information having a first scan period. For example, the first scan period may be about 10 ms. The processor 110 may provide the first motion data to the first data controller 106. The processor 110 and/or the first data controller 106 may not only measure a folding angle of the external device 120 but also may determine motion, such as a mounting state and/or a rotation state of the electronic device 100, of the electronic device 100 based on the first scan period.

In an embodiment, the second data controller 126 may request second motion data from the second motion sensor 129 in response to the request of the first data controller 106 and obtain the second motion data. The second motion data may include information having a second scan period. The second scan period may be a period longer than the first scan period. For example, the first scan period may be about 10 ms, and the second scan period may be about 200 ms. The second data controller 126 may provide the second motion data to the first data controller 106.

In an embodiment, the first data controller 106 may determine a folding angle between the electronic device 100 and the external device 120 based on the first motion data obtained through the processor 110 and the second motion data obtained through the second data controller 126.

In an embodiment, the first data controller 106 may provide information on the determined folding angle to the processor 110. The processor 110 may control an input mode based on the provided information on the folding angle. The input mode may include at least a first input mode, a second input mode, and the third input mode.

In an embodiment, in the first input mode in FIG. 3A, the processor 110 may obtain a user input through the display 101, the keyboard 122, and the touchpad 124, and may perform a function corresponding to the input. The display 101 may receive a user input (e.g., a touch input through the hand of a user) through a touch panel disposed above the display 101, and may receive a user input (e.g., a stylus pen input) through a digitizer panel disposed below the display 101.

In an embodiment, in the second input mode in FIG. 3B, the processor 110 may obtain a user input through the keyboard 122, and the touchpad 124 and may operate the electronic device 100 through the input. The processor 110 may block a user touch input through the display 101.

In an embodiment, in the third input mode in FIG. 3B, the processor 110 may obtain a user input through the display 101, and may operate the electronic device 100 through the input. The processor 110 may block a user input through the external device 120.

Figure 4:
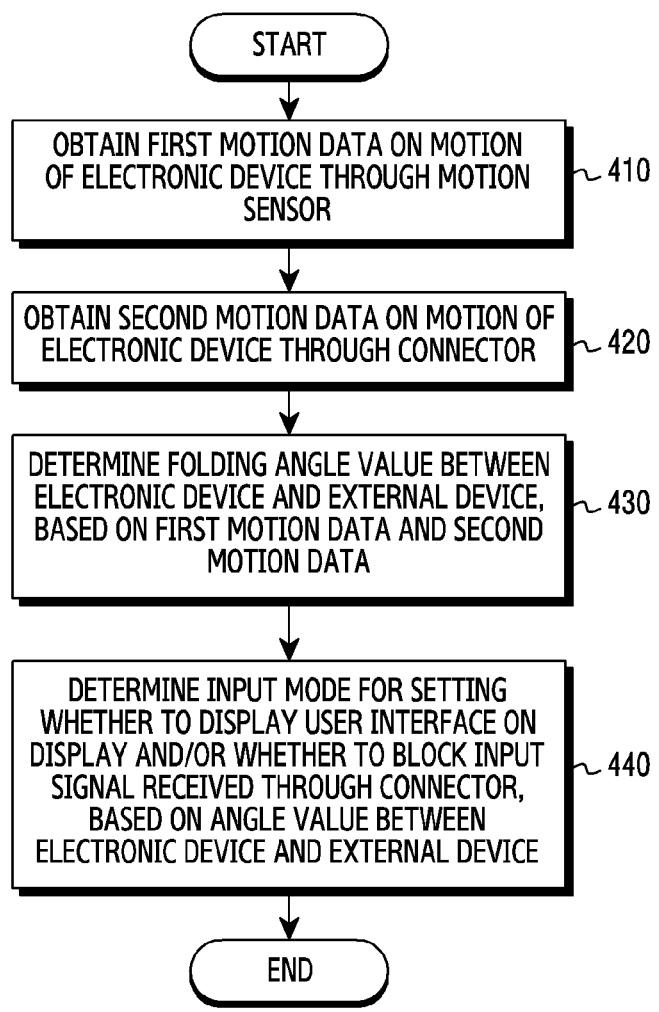
FIG. 4 is a flowchart in which in an electronic device according to an embodiment, an input mode of the electronic device is determined according to a folding angle between the electronic device and an external device.

FIG. 4 is a flowchart in which in an electronic device 100 according to an embodiment, an input mode of the electronic device 100 is determined according to a folding angle between the electronic device 100 and an external device 120. In the embodiment below, respective operations may be sequentially performed, but may not be necessarily sequentially performed. For example, the order of respective operations may be changed, and at least two operations may be performed in parallel. A subject performing an operation in FIG. 4 may be understood as the processor 110 in FIG. 2 or the first data controller 106 in FIG. 2.

In operation 410 according to an embodiment, the processor 110 or the first data controller 106 may obtain first motion data on motion of the electronic device 100 through a motion sensor (e.g., the first motion sensor 109 in FIG. 2). The first motion sensor 109 may include at least one of an acceleration sensor, a gyro sensor, and a geomagnetic sensor. The first motion data may include three-axis motion information (x1, y1, z1) or include nine-axis motion information obtained using a gyro sensor and a geomagnetic sensor.

In an embodiment, the first data controller 106 may obtain the first motion data having a first scan period (e.g., about 10 ms) through the first motion sensor 109. The first data controller 106 may directly obtain the first motion data from the first motion sensor 109 or receive the first motion data obtained by the processor 110.

In an embodiment, in case a folding angle between the electronic device 100 and the external device 120 is about 0° (or about 0° to about 5°), the processor 110 or the first data controller 106 may not obtain motion data through the first motion sensor 109. For example, in case a folding angle between the electronic device 100 and the external device 120 is about 0° to about 5°, the interrupt signal may not be generated. In this case, the processor 110 may determine that a mounting state of the electronic device 100 is a closed state, and may not operate the first motion sensor 109 in order to minimize current consumption.

In operation 420 according to an embodiment, the processor 110 or the first data controller 106 may obtain second motion data on motion of the electronic device 100 through a connector (e.g., the second connector 142 in FIG. 2). The second motion sensor 129 may include at least one of an acceleration sensor and a gyro sensor. The second motion sensor 129 is not limited to the acceleration sensor and the gyro sensor, and may further include at least a geomagnetic sensor. The second motion data may include three-axis motion information (x2, y2, z2) or include nine-axis motion information obtained using a gyro sensor and a geomagnetic sensor. The second motion data may include three-axis motion information (x2, y2, z2) or include six-axis motion information obtained using a gyro sensor. However, the second motion data is not limited to the three-axis motion information and the six-axis motion information.

In an embodiment, the second data controller 126 may obtain motion data having a second scan period (about 200 ms) longer than the first scan period through the second motion sensor 129. The second data controller 126 may provide the obtained second motion data to the first data controller 106 through the second connector 142. For example, the electronic device 100 may apply power to the external device 120 through the first connector 141, and the second data controller 126 may provide, to the first data controller 106, the second motion data having a scan period of 200 ms in response to power application and/or an interrupt signal.

In an embodiment, in case a folding angle between the electronic device 100 and the external device 120 is about 0° to about 5°, the processor 110 or the second data controller 126 may not obtain motion data through the second motion sensor 129. For example, in case a folding angle between the electronic device 100 and the external device 120 is about 0° to about 5°, the interrupt signal may not be generated. In this case, the processor 110 may determine that a mounting state of the electronic device 100 is a closed state, and may not operate the second motion sensor 129 in order to minimize current consumption.

In operation 430 according to an embodiment, the first data controller 106 may determine a folding angle between the electronic device 100 and the external device 120 based on the first motion data and the second motion data.

In an embodiment, the first data controller 106 may include at least one micro controller unit (MCU). The first data controller 106 may determine a relative folding angle between the electronic device 100 and the external device 120 through the micro controller unit based on the first motion data (e.g., x1, y1, z1) and the second motion data (e.g., x2, y2, z2).

In an embodiment, the first data controller 106 may determine the folding angle between the electronic device 100 and the external device 120 based on the first motion data having the first scan period and the second motion data having the second scan period. The second scan period may be longer than the first scan period. For example, the first scan period may be 10 ms, the second scan period may be about 200 ms.

In an embodiment, the processor 110 may simultaneously request motion data from the first motion sensor and the second motion sensor in response to an interrupt signal. The interrupt signal may be generated when an impact of a predetermined strength or more is applied to the electronic device 100 or when the processor 110 receives an input through the keyboard 122 and/or the touchpad 124. In addition, the interrupt signal may be generated when a folding gesture, in which a folding angle is changed to a designated critical angle (e.g., about 80°) or more, is detected. For example, the interrupt signal may be generated when the processor 110 or the first data controller 106 detects that a folding angle changes from about 0° to about 90° (or about 80° or more), or that a folding angle changes from about 130° to about 350° (or about 80° or more).

TABLE 1

| Interrupt signal | First motion sensor | Second motion sensor |
| --- | --- | --- |
| Nothing | Fast Scan Time | Slow Scan Time |
| Keyboard Interrupt | Synchronous Request | Synchronous Request |
| Touch Interrupt | Synchronous Request | Synchronous Request |

Table 1 shows that the processor 110 controls the motion sensor based on the interrupt signal. In operation 440 according to an embodiment, the processor 110 may determine an input mode for controlling whether to display a user interface (e.g., a virtual keyboard) on the display 101 and/or whether to block an input signal received through a connector (e.g., the second connector 142 in FIG. 2) based on a folding angle between the electronic device 100 and the external device 120. Various embodiments related thereto may be described through FIG. 5 and FIG. 6 below.

Figure 5:
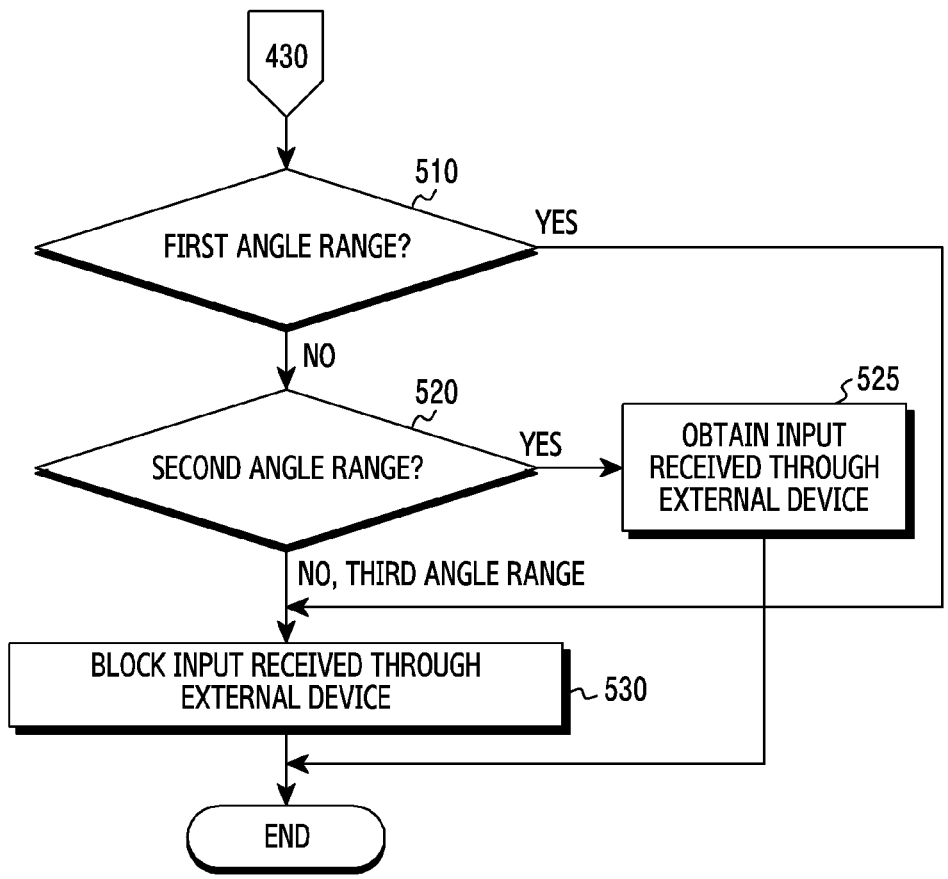
FIG. 5 shows a flowchart in which an input mode is controlled according to an angle range between an electronic device according to an embodiment and an external device.

FIG. 5 shows a flowchart in which an input mode is controlled according to a folding angle range between an electronic device according to an embodiment and an external device. In the embodiment below, respective operations may be sequentially performed, but may not be necessarily sequentially performed. The order of respective operations may be changed, and at least two operations may be performed in parallel. For example, the order of determining an angle range in operation 510 and operation 520 may be changed. A subject performing an operation in FIG. 5 may be understood as the processor 110 in FIG. 2 or the first data controller 106 in FIG. 2.

In operation 510 according to an embodiment, the processor 110 may determine whether a folding angle between the electronic device 100 and the external device 120 falls within a first angle range. In the embodiment of FIG. 5, the first angle range may be about 0° to about 30° (or 0° to a first threshold value). An input mode performed in the first angle range in FIG. 5 may be referred to as a first input mode in FIG. 5.

In an embodiment, in case the folding angle falls within the first angle range, operation 530 may be performed. In case the folding angle falls within the first angle range, at the same time that operation 530 is performed, the processor 110 may block a user touch input received through the display 101. For example, the meaning of blocking a user touch input received through the display 101 may be understood that a user touch input is not received by turning off the display 101 or a user interface (e.g., a virtual keyboard) is not displayed on the display 101. For another example, the meaning of blocking a user touch input may be understood that a user touch input is ignored even though the user touch input is received in a state where the display 101 is on.

In an embodiment, in case the folding angle does not fall within the first angle range, operation 520 is performed, and thus the processor 110 may determine whether the folding angle falls within the second angle range.

In operation 520 according to an embodiment, the processor 110 may determine whether a folding angle between the electronic device 100 and the external device 120 falls within the second angle range. In the embodiment of FIG. 5, the second angle range may be about 30° to about 240° (or a first threshold value to a second threshold value). An input mode performed in the second angle range in FIG. 5 may be referred to as a second input mode in FIG. 5.

In an embodiment, in case the folding angle falls within the second angle range, operation 525 is performed, and thus the processor 110 may obtain an input received through the external device 120. In case the folding angle falls within the second angle range, the processor 110 may not display a user interface (e.g., a virtual keyboard) on the display 101. However, the processor 110 may display a user interface (e.g., a virtual keyboard) on a partial area of the display 101 according to a user setting. The processor 110 may display a user interface (e.g., a virtual keyboard) on a partial area of the display 101 in response to a selection input for a user input field and/or an execution application.

In an embodiment, in case the folding angle does not fall within the second angle range, operation 530 may be performed.

In operation 525 according to an embodiment, the processor 110 may obtain an input received through the external device 120. The processor 110 may activate the keyboard 122 and the touchpad 124 of the external device 120 and may control an input mode to obtain a user input in case the folding angle falls within the second angle range. The processor 110 may receive an input signal according to the case where a user presses a keyboard key or touches a touchpad in the state of being controlled in the input mode. The processor 110 may control the displaying of the display 101, which corresponds to the received input signal. For example, the processor 110 may control to display an input received for an input field of an application that a user wants to execute, or to display a designated execution function of an activated application.

In an embodiment, in case the folding angle falls within the second angle range and there is no user input through the keyboard 122 and/or the touchpad 124 of the external device 120 during a predetermined time period, the processor 110 may deactivate the keyboard 122 and the touchpad 124 to control to block a user input. For example, in case a user does not use the keyboard 122 and/or the touchpad 124 during a designate time period (e.g., about 15 seconds) or more, the processor 110 may deactivate the keyboard 122 and/or the touchpad 124 so as not to receive a user input. In case a user input is detected at least once in a state where the keyboard 122 and/or the touchpad 124 is deactivated, the processor 110 may activate the keyboard 122 and/or touchpad 124 again.

In operation 530 according to an embodiment, in a state where a folding angle between the electronic device 100 and the external device 120 falls within a third angle range, the processor 110 may block an input received through the external device 120. In the embodiment of FIG. 5, the third angle range may be about 240° to about 360° (or a second threshold value to about 360°). An input mode performed in the third angle range in FIG. 5 may be referred to as the third input mode in FIG. 5. The meaning of blocking the input may be understood that an input signal is blocked by the external device 120 or the input signal received through the external device 120 is ignored by the processor 110 or the first data controller 106. In case an input through a keyboard key is detected or an input through a touchpad is detected, the processor 110 may block the input so as not to process an unnecessary input signal unintended by a user. For example, in case the folding angle is about 360° (or about 350° to about 360°, it may be referred to as a back flip mode, and in an operation in which a folding angle reduces from 350°, at which the back flip mode is released, to 240°, an input signal received through the external device 120 is blocked and thus an input signal unintended by a user may not be processed.

In an embodiment, in case the folding angle falls within the third angle range, the processor 110 may display a user interface (e.g., a virtual keyboard) through the display 101. The processor 110 may control the displaying of the display 101 in response to a user input obtained through the display 101.

Figure 6:
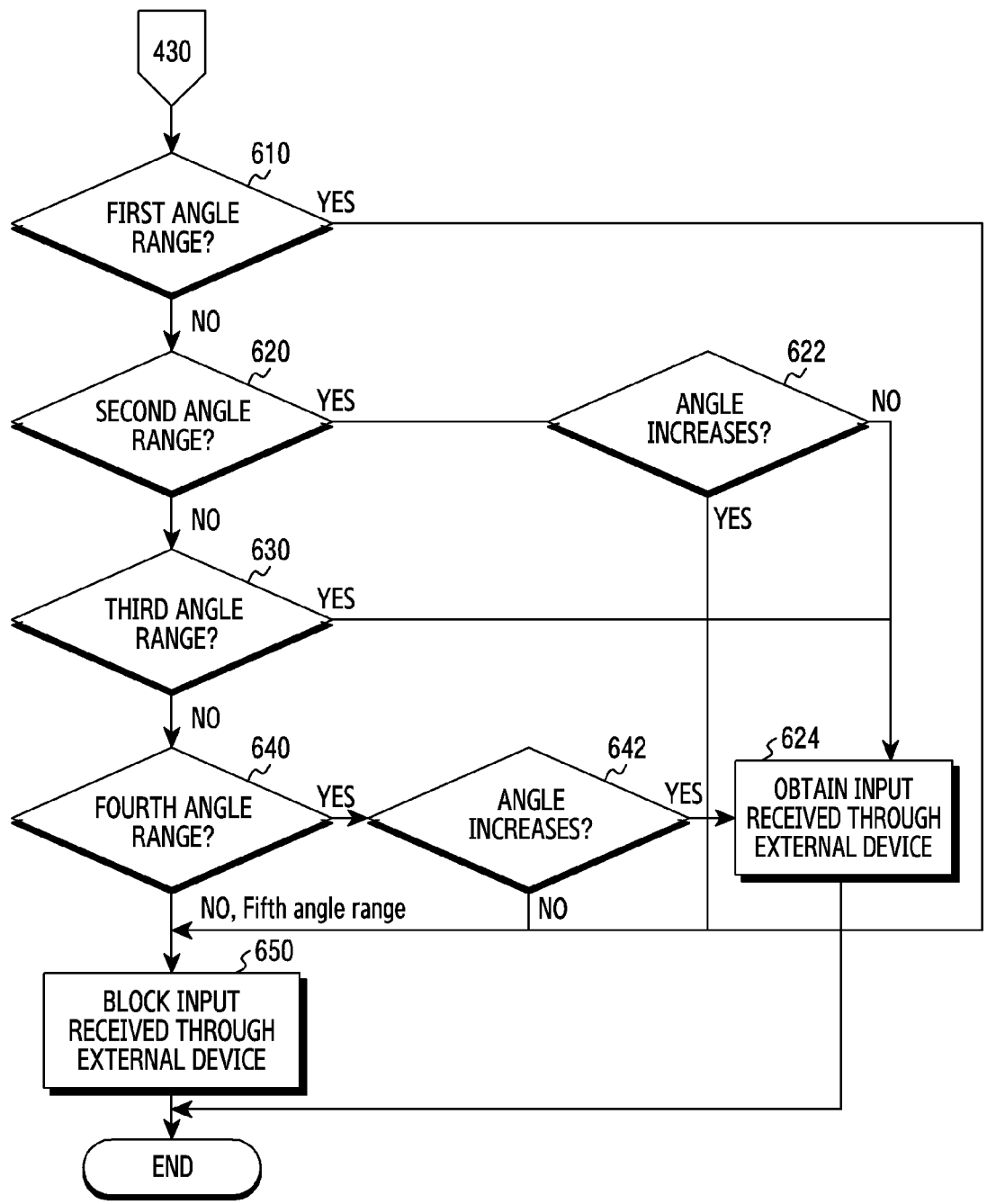
FIG. 6 shows a flowchart in which a processor controls an input mode of an external device according to a folding angle range according to an embodiment.

FIG. 6 shows a flowchart in which a processor 110 controls an input mode (e.g., a keyboard input mode and a touchpad input mode) of an external device 120 according to a folding angle range according to an embodiment. In the embodiment below, respective operations may be sequentially performed, but may not be necessarily sequentially performed. The order of respective operations may be changed, and at least two operations may be performed in parallel. For example, the order of determining an angle range in operation 610, operation 620, operation 630, and operation 640 may be changed. A subject performing an operation in FIG. 6 may be understood as the processor 110 in FIG. 2 or the first data controller 106 in FIG. 2. Hereinafter, the description in FIG. 6 may correspond to the angle range illustrated in FIG. 7A and the angle mark illustrated in FIG. 7B.

In operation 610 according to an embodiment, the processor 110 may determine whether a folding angle between the electronic device 100 and the external device 120 falls within the first angle range. In the embodiment of FIG. 6, the first angle range may include about 0° to about 30°. An input mode performed in the first angle range in FIG. 6 may be referred to as a first input mode in FIG. 6.

In an embodiment, in case the folding angle falls within the first angle range, operation 650 is performed, and thus the processor 110 may block an input received through the external device 120. In case the folding angle falls within the first angle range, the processor 110 may block a user touch input received through the display 101. For example, in case the folding angle falls within about 0° to about 30°, the electronic device 100 may block a user input through the display 101, and the keyboard 122 and the touchpad 124 of the external device 120.

In an embodiment, in case a folding angle does not fall within the first angle range, operation 620 is performed, and thus the processor 110 may determine whether the folding angle falls within the second angle range.

In operation 620 according to an embodiment, the processor 110 may determine whether a folding angle between the electronic device 100 and the external device 120 falls within the second angle range. In the embodiment of FIG. 6, the second angle range may include about 30° to about 50°. The second angle range may be a hysteresis section. Hysteresis may be understood as determining a current state by considering together, not only a current condition but also a previous condition. For example, in case of the process of changing from the first angle range to the third angle range even within the second angle range, a first input mode in the first angle range within the second angle range may be performed. Conversely, in case of the process of changing from the third angle range to the first angle range, a second input mode in the third angle range within the second angle range may be performed.

In operation 622 according to an embodiment, the processor 110 may determine whether a folding angle increases within the second angle range. The processor 110 may determine whether the folding angle is increasing within the second angle range through angle calculation. For example, the processor 110 may determine whether the folding angle increases from 31° to 49° or the folding angle decreases from 49° to 31°, through angle calculation. The case, in which the folding angle increases, may be understood as a process in which the electronic device 100 is unfolded, by a user, from the first angle range (e.g., about 0° to about 30°) of operation 610 to the third angle range (about 50° to about 210°) of operation 630. The case, in which the folding angle decreases, may be understood as a process in which the electronic device 100 is folded, by a user, from the third angle range (about 50° to about 210°) of operation 630 to the first angle range (about 0° to about 30°) of operation 610. In case the folding angle increases, operation 650 is performed, and in case the folding angle decreases, operation 624 is performed.

In operation 624 according to an embodiment, the processor 110 may obtain an input received through the external device 120. The processor 110 may activate the keyboard 122 and the touchpad 124 of the external device 120 and may switch an input mode to obtain a user input.

In operation 630 according to an embodiment, the processor 110 may determine whether a folding angle between the electronic device 100 and the external device 120 falls within the third angle range. In the embodiment of FIG. 6, the third angle range may include about 50° to about 210°. An input mode performed in the third angle range in FIG. 6 may be referred to as a second input mode in FIG. 6.

In an embodiment, in case the folding angle falls within the third angle range, operation 624 is performed, and thus the processor 110 may obtain an input received through the external device 120. In case the folding angle falls within the third angle range, the processor 110 may not display a user interface (e.g., a virtual keyboard) on the display 101. However, the processor 110 may display a user interface (e.g., a virtual keyboard) on a partial area of the display 101 according to a user setting.

In an embodiment, in case the folding angle does not fall within the third angle range, operation 640 is performed, and thus the processor 110 may determine whether the folding angle falls within a fourth angle range.

In operation 640 according to an embodiment, the processor 110 may determine whether a folding angle between the electronic device 100 and the external device 120 falls within the fourth angle range. In the embodiment of FIG. 6, the fourth angle range may include about 210° to about 240°. The fourth angle range may be a hysteresis section. For example, in case the folding angle increases from 211° to 239° in the fourth angle range, the second input mode in the third angle range may be operated. For another example, in case the folding angle decreases from 239° to 211° in the fourth angle range, the third input mode in a fifth angle range may be operated.

In an embodiment, in case the folding angle does not fall within the fourth angle range, the folding angle may be included in the fifth angle range. In this case, operation 650 may be performed.

In operation 642 according to an embodiment, the processor 110 may determine whether a folding angle increases within the fourth angle range. The processor 110 may determine whether the folding angle is increasing within the fourth angle range through folding angle calculation. For example, the processor 110 may determine whether the folding angle increases from 211° to 239° or whether the folding angle decreases from 239° to 211°, through angle calculation. In case the folding angle increases, operation 624 is performed, and in case the folding angle decreases, operation 650 is performed.

In operation 650 according to an embodiment, in a state where the folding angle between the electronic device 100 and the external device 120 falls within the fifth angle range, the processor 110 may block an input received through the external device 120. In the embodiment of FIG. 6, the fifth angle range may include about 240° to about 360°. An input mode performed in the fifth angle range in FIG. 6 may be referred to as the third input mode in FIG. 6. The meaning of blocking the input may be understood that an input signal is blocked by the external device 120 or the input signal received through the external device 120 is ignored by the processor 110 or the first data controller 106. For example, in case an input through a keyboard key is detected or an input through a touchpad is detected, the processor 110 may block the input so as not to process an unnecessary input signal unintended by a user. For example, in case the folding angle is about 350° to about 360°, it may be referred to as a back flip mode, and in an operation in which a folding angle reduces from 350°, at which the back flip mode is released, to 240°, an input signal received through the external device 120 is blocked and thus an input signal unintended by a user may not be processed.

In an embodiment, in case the folding angle falls within the fifth angle range, the processor 110 may display a user interface (e.g., a virtual keyboard) through the display 101. The processor 110 may control the displaying of the display 101 in response to a user input obtained through the display 101.

Figure 7A:
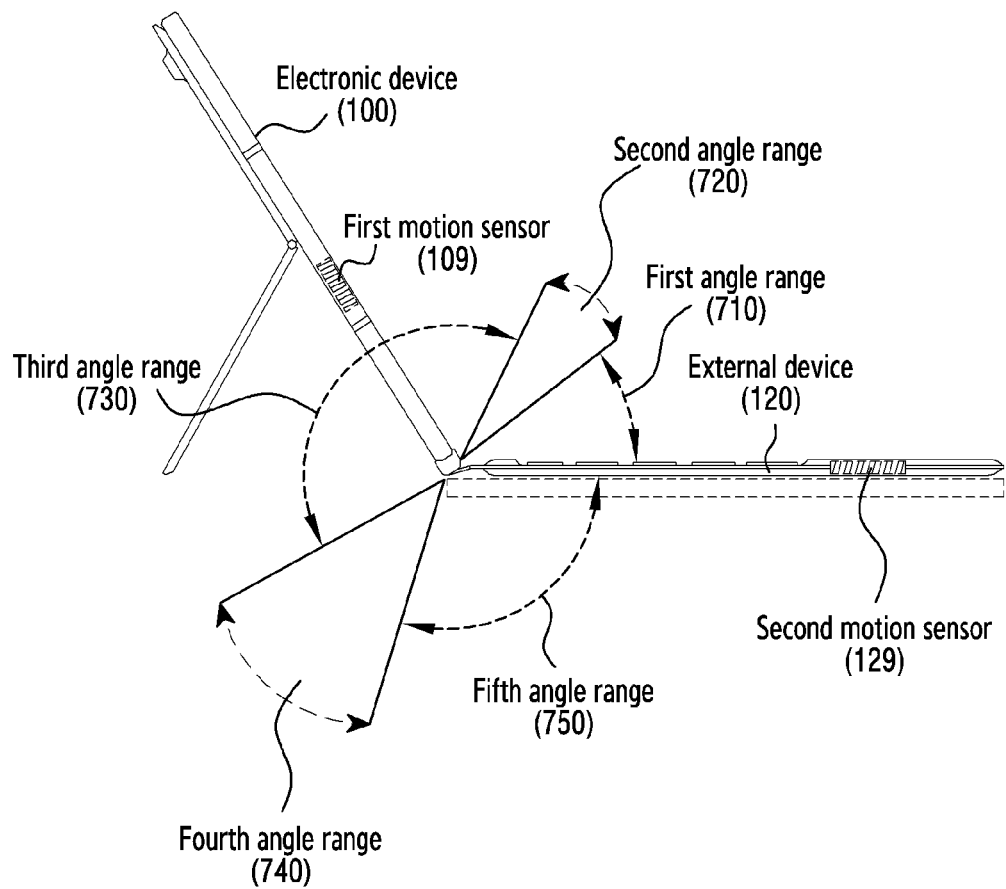
FIG. 7A is a view showing that various folding angles may be implemented by a folding operation of an external device in an electronic device according to an embodiment.
Figure 7B:
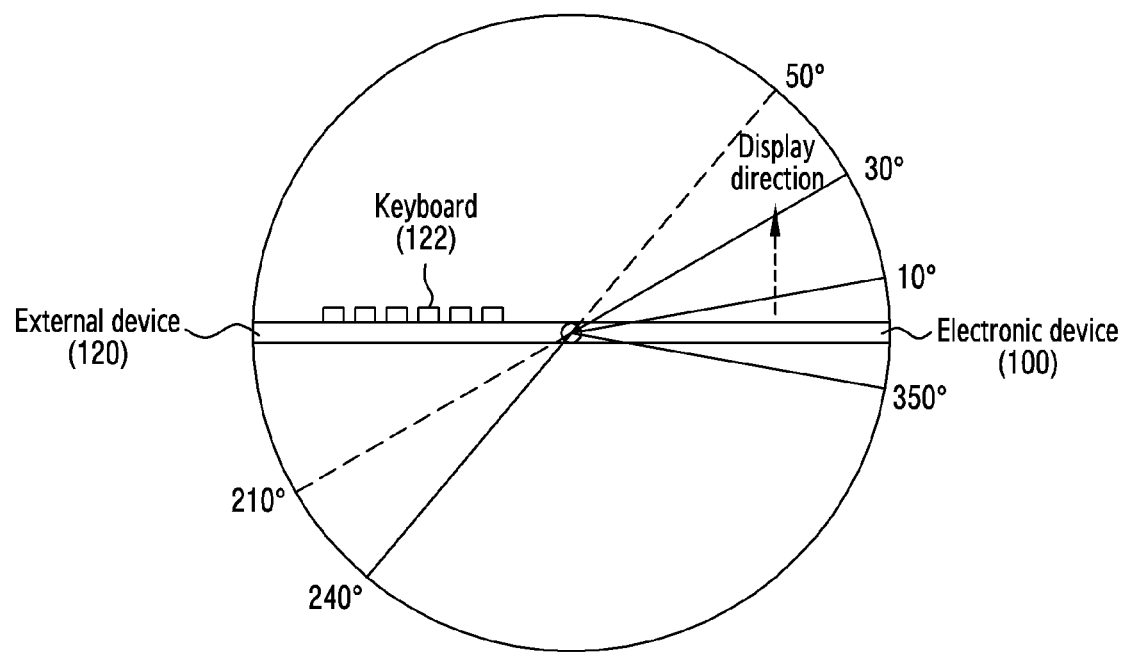
FIG. 7B is a view showing that various folding angles may be implemented by a folding operation of an external device in an electronic device according to an embodiment.

FIG. 7A is a view showing that various folding angles may be implemented by a folding operation of an external device 120 in an electronic device 100 according to an embodiment. FIG. 7B is a view showing that various folding angles may be implemented by a folding operation of an external device 120 in an electronic device 100 according to an embodiment. The first angle range 610 to the fifth angle range 650 illustrated in FIG. 7A may correspond to the description in FIG. 6. The angle mark illustrated in FIG. 7B may correspond to the description in FIG. 6.

Figure 8A:
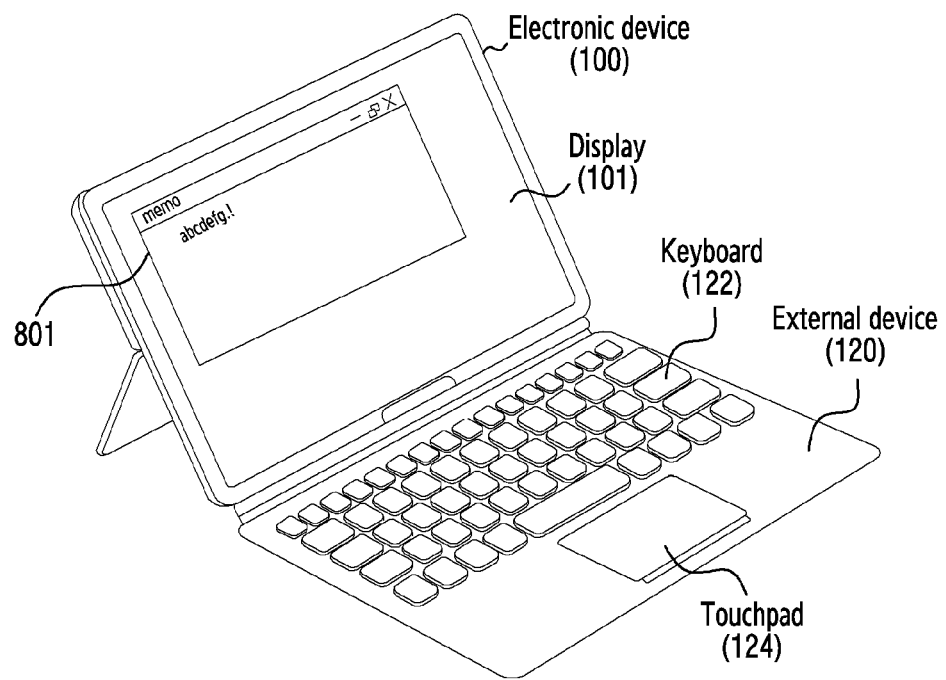
FIG. 8A is a view showing that a virtual keyboard is displayed through a display in case a folding angle between an electronic device according to an embodiment and an external device falls within a first angle range (e.g., about 110°).

FIG. 8A is a view showing that a user interface (e.g., a virtual keyboard) 801 is displayed through a display 101 in case the folding angle between an electronic device 100 according to an embodiment and an external device 120 falls within the first angle (e.g., 110°). The virtual keyboard illustrated in FIG. 8A may not be a virtual keyboard which is automatically displayed by the processor 110 according to the switching to an input mode, but may be a virtual keyboard which is additionally displayed by a user setting.

Referring to FIG. 8A, in an embodiment, the electronic device 100 may receive an input through the keyboard 122 of the external device 120, and then may display a function corresponding to an input through the keyboard 122 on the display 101. For example, the processor 110 may activate a memo application 801, and may display a function corresponding to an input through the keyboard 122 by a user on the display 101 through the memo application 801.

In an embodiment, the electronic device 100 may display a virtual keyboard on the display 101 in response to a user input for displaying a user interface (e.g., a virtual keyboard). The user input may be a user input for selecting an input mode such as a pen input mode or a virtual keyboard mode by using a setting change tab in a control panel of the electronic device 100. Alternatively, the user input may be displaying a user interface (e.g., a virtual keyboard) through a voice input such as "Please, display a virtual keyboard." by using the voice recognition function of the electronic device 100. The electronic device 100 may obtain a user input through the keyboard 122 and the touchpad 124 of the external device 120. In addition, the electronic device 100 may obtain a user touch input through the display 101 of a touch screen.

Figure 8B:
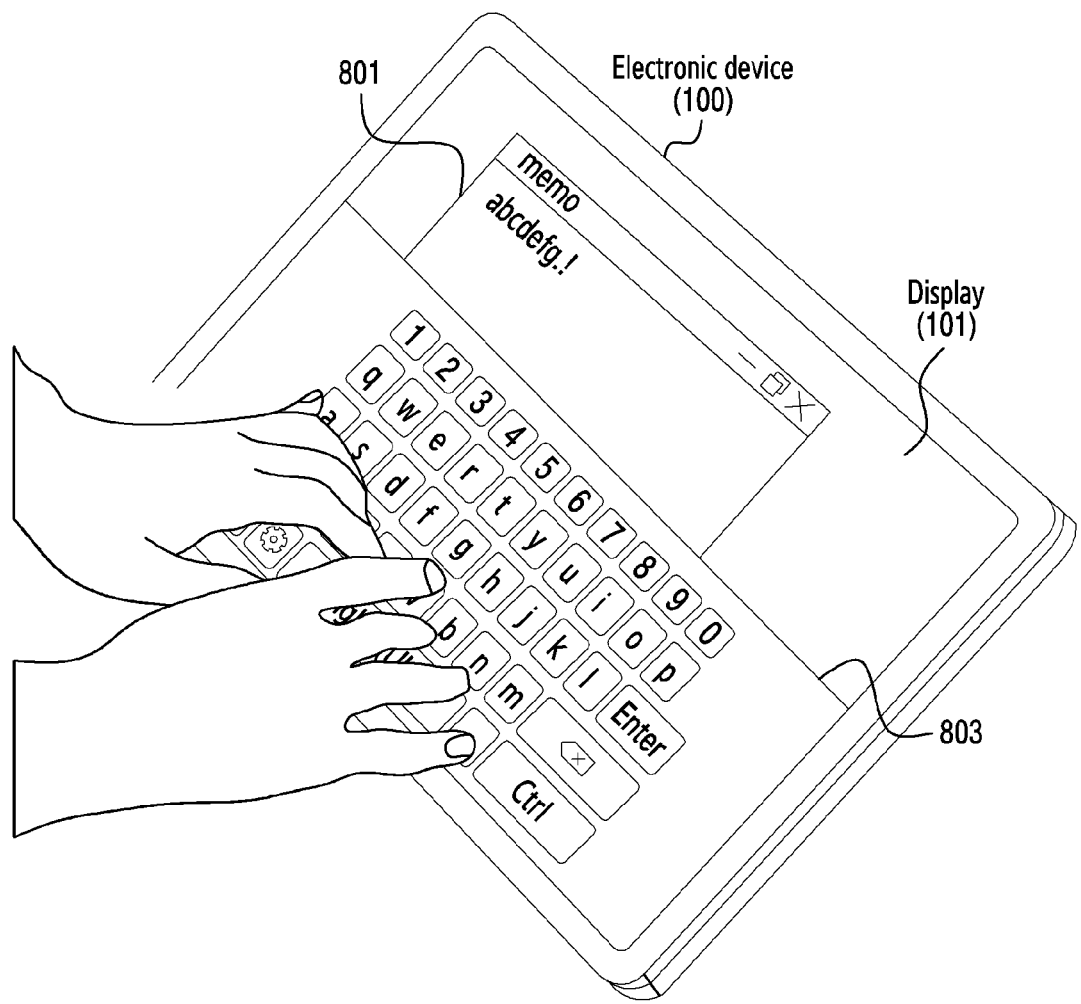
FIG. 8B is a view showing that a virtual keyboard is displayed through a display in case a folding angle between an electronic device according to an embodiment and an external device falls within a second angle range (e.g., about 360°).

FIG. 8B is a view showing that a user interface (e.g., a virtual keyboard 803) is displayed through the display 101 in case the folding angle between an electronic device 100 according to an embodiment and an external device 120 falls within the second angle range (e.g., about 360°). The virtual keyboard illustrated in FIG. 8B may be a virtual keyboard which is automatically displayed by the processor 110 according to the switching to an input mode.

In an embodiment, the processor 110 may automatically display a user interface (e.g., the virtual keyboard 803) on the display 101 in response to the folding angle belonging to a specific range (e.g., about 240° to about 360°). For example, in case the folding angle is changed from the first angle (e.g., 110°) as illustrated in FIG. 8A to the second angle (e.g., 360°) as illustrated in FIG. 8B, the processor 110 may block an input through the keyboard 122 and an input through the touchpad 124, and display a user interface (e.g., the virtual keyboard 803) while maintaining the activated state of the memo application 801. The processor 110 may display a function corresponding to an input through the virtual keyboard 803 by a user on the display 101 through the memo application 801. Here, the memo application 801 may be merely one example of various applications and/or functions which may be performed by the processor 110, and it may be understood at the level of a person skilled in the art that the processor 110 may perform various functions in response to an input through the virtual keyboard 803.

In an embodiment, in case the folding angle is about 360°, the display 101 of the electronic device 100 and the keyboard 122 of the external device 120 may be arranged to be oriented in different directions. In this state, in case the electronic device 100 is used by a user while placed on the lap of the user, even though the keyboard key is pressed by the lap, the processor 110 may block an input through the keyboard so that operations unintended by the user are not performed. The meaning of blocking the input may be understood that an input signal is blocked by the external device 120 or the input signal received through the external device 120 is ignored by the processor 110 or the first data controller 106.

Figure 9:
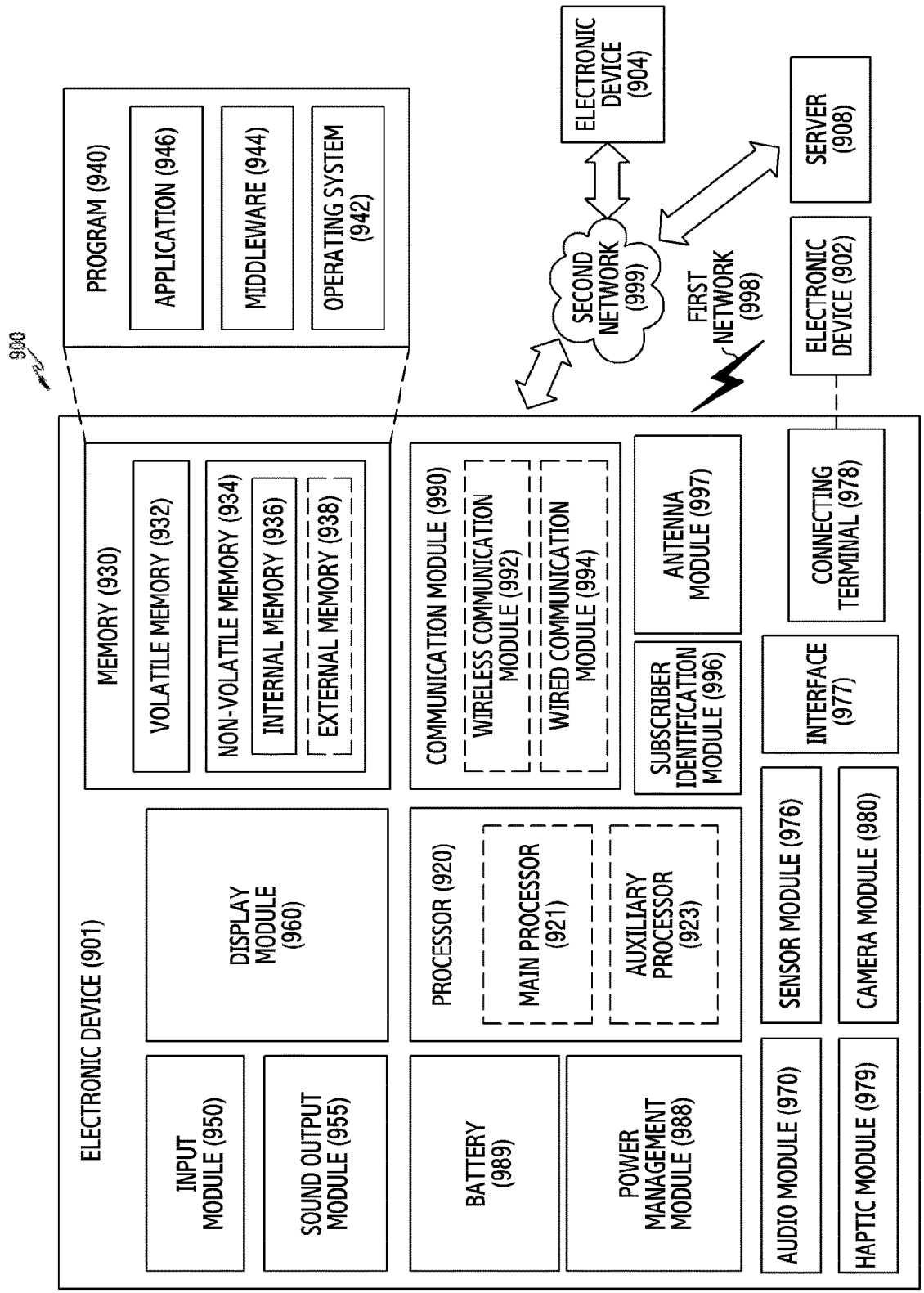
FIG. 9 is a block diagram of an electronic device in a network environment according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thererto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device 100 may include a display 101, at least one motion sensor 109 configured to detect motion of the electronic device 100, a coupling device coupled to an external device to be rotatable with respect to the electronic device, a connector connected to the external device to transmit a signal to the external device or receive a signal from the external device as the electronic device is coupled to the external device, and at least one processor operatively connected to the display, the at least one motion sensor, and the connector.

In an embodiment, the at least one processor (e.g., the processor 110 in FIG. 2 or the first data controller 106 in FIG. 2) may be configured to obtain first motion data on motion of the electronic device 100 through the at least one motion sensor (e.g., the first motion sensor 109 in FIG. 2) and to obtain second motion data on motion of the external device (e.g., the external device 120 in FIG. 2) through the connector (e.g., the connector module 140 in FIG. 2).

In an embodiment, the at least one processor (e.g., the processor 110 in FIG. 2 or the first data controller 106 in FIG. 2) may be configured to determine a folding angle between the electronic device and the external device based on the first motion data and the second motion data.

The at least one processor (e.g., the processor 110 in FIG. 2 or the first data controller 106 in FIG. 2) may be configured to determine an input mode for setting whether to display a user interface on the display (e.g., the display 101 in FIG. 2) or whether to block an input signal received through the connector based on the determined folding angle.

According to an embodiment, the processor 110 may be configured to block an input signal received through the connector without displaying a user interface on the display

101 in case the determined folding angle falls within a first angle range (e.g., about 0° to about 30°).

According to an embodiment, in case the folding angle falls within a second angle range (e.g., about 31° to about 240°), the processor 110 may be configured to obtain an input signal received through the connector. The processor 110 may be configured to display a user interface corresponding to a user input on the display 101 in response to the input signal.

According to an embodiment, the second angle range may include a first hysteresis range and a second hysteresis range. The processor 110 may be configured to block an input signal received through the connector in case the folding angle increases in the first hysteresis range, and to obtain the input signal in case the folding angle decreases. The processor 110 may be configured to obtain an input signal received through the connector in case the folding angle increases in the second hysteresis range, and to block the input signal in case the folding angle decreases. The first hysteresis range may include an angle range of 31° to 49°, and the second hysteresis range may include an angle range of 211° to 239°.

According to an embodiment, in case the folding angle falls within a third angle range (e.g., about 241° to about 360°), the processor 110 may be configured to block an input signal received through the connector.

According to an embodiment, the input signal may include at least one of an input signal through a keyboard 122 and an input signal through a touchpad 124, which are included in the external device 120.

According to an embodiment, the connector may include a POGO connector, and the processor 110 may be configured to apply power to the external device 120 through the connector and to obtain motion data from the external device 120.

According to an embodiment, the electronic device 100 may include a first data controller 106 configured to determine the folding angle. The first data controller 106 may be configured to directly obtain the motion data from the at least one motion sensor or obtain the motion data through the processor 110.

According to an embodiment, the processor 110 or the first data controller 103 may be configured to determine the folding angle based on the first motion data having a first scan period and the second motion data having a second scan period longer than the first scan period.

According to various embodiments, a method for operating an electronic device 100 may include an operation of obtaining first motion data on motion of the electronic device through at least one motion sensor, an operation of obtaining second motion data on motion of an external device through a connector, an operation of determining a folding angle between the electronic device and the external device based on the first motion data and the second motion data, and an operation of determining an input mode for setting whether to display a user interface on the display or whether to block an input signal received through the connector based on the determined folding angle.

According to an embodiment, the method for operating an electronic device 100 may include an operation of blocking an input signal received through the connector without displaying a user interface on the display 101 in case the determined folding angle falls within a first angle range (e.g., about 0° to about 30°).

According to an embodiment, the method for operating an electronic device 100 may include an operation of obtaining an input signal received through the connector in case the determined folding angle falls within a second angle range (e.g., about 31° to about 240°). The method for operating an electronic device 100 may include an operation of displaying a user interface corresponding to a user input on the display 101 in response to the input signal.

According to an embodiment, the second angle range (e.g., about 31° to about 240°) may include a first hysteresis range and a second hysteresis range.

According to an embodiment, the method for operating an electronic device 100 may include an operation of blocking an input signal received through the connector in case the folding angle increases in the first hysteresis range, an operation of obtaining the input signal in case the folding angle decreases in the first hysteresis range, an operation of obtaining an input signal received through the connector in case the folding angle increases in the second hysteresis range, and an operation of blocking the input signal in case the folding angle decreases in the second hysteresis range. The first hysteresis range may include 31° to 49°, and the second hysteresis range may include 211° to 239°.

According to an embodiment, the method for operating an electronic device 100 may include an operation of blocking an input signal received through the connector in case the folding angle falls within a third angle range (e.g., about 241° to about 360°).

According to an embodiment, the method for operating an electronic device 100 may include an operation in which a first data controller 106 directly obtains the motion data from the at least one motion sensor or an operation in which the first data controller 106 obtains the motion data through the processor 110.

According to an embodiment, the method for operating an electronic device 100 may include an operation of determining the folding angle based on the first motion data having a first scan period and the second motion data having a second scan period longer than the first scan period.

What is claimed is:
1. An electronic device comprising:
   a display;
   at least one motion sensor configured to detect motion of the electronic device;
   a coupling device coupled to an external device to be rotatable with respect to the electronic device;
   a connector connected to the external device to transmit a signal to the external device or receive a signal from the external device as the electronic device is coupled to the external device; and
   at least one processor operatively connected to the display, the at least one motion sensor, and the connector,
   wherein the at least one processor is configured to:
   obtain first motion data on motion of the electronic device through the at least one motion sensor;
   obtain second motion data on motion of the external device through the connector;
   determine a folding angle between the electronic device and the external device based on the first motion data and the second motion data; and
   determine an input mode for setting whether to display a user interface on the display and/or whether to block an input signal received through the connector based on the determined folding angle.

2. The electronic device of claim 1, wherein the at least one processor is configured to block an input signal received through the connector without displaying a user interface on the display in case the determined folding angle falls within a first angle range.

3. The electronic device of claim 1, wherein the at least one processor is configured to obtain an input signal received through the connector in case the folding angle falls within a second angle range, and display a user interface corresponding to a user input on the display in response to the input signal.

4. The electronic device of claim 3, wherein the second angle range comprises a first hysteresis range and a second hysteresis range,
an input signal received through the connector is blocked in case the folding angle increases in the first hysteresis range and the input signal is obtained in case the folding angle decreases, and
an input signal received through the connector is obtained in case the folding angle increases in the second hysteresis range and the input signal is blocked in case the folding angle decreases.

5. The electronic device of claim 4, wherein the first hysteresis range comprises an angle range of 31° to 49°, and the second hysteresis range comprises an angle range of 211° to 239°.

6. The electronic device of claim 1, wherein in case the folding angle falls within a third angle range, the at least one processor is configured to block an input signal received through the connector.

7. The electronic device of claim 1, wherein the input signal comprises at least one of an input signal through a keyboard included in the external device and an input signal through a touchpad included in the external device.

8. The electronic device of claim 1, wherein the connector comprises a POGO connector, and
the at least one processor is configured to apply power to the external device through the connector and to obtain motion data from the external device.

9. The electronic device of claim 1, wherein the at least one processor comprises a processor and a data controller configured to determine the folding angle, and
the data controller is configured to directly obtain the motion data from the at least one motion sensor or obtain the motion data through the processor.

10. The electronic device of claim 1, wherein the at least one processor is configured to determine the folding angle based on the first motion data having a first scan period and the second motion data having a second scan period longer than the first scan period.

11. An operation method of an electronic device, the operation method comprising:
obtaining first motion data on motion of the electronic device through at least one motion sensor;
obtaining second motion data on motion of an external device through a connector;
determining a folding angle between the electronic device and the external device based on the first motion data and the second motion data; and
determining an input mode for setting whether to display a user interface on the display or whether to block an input signal received through the connector based on the determined folding angle.

12. The operation method of claim 11, comprising blocking an input signal received through the connector without displaying a user interface on the display in case the determined folding angle falls within a first angle range.

13. The operation method of claim 11, comprising:
obtaining an input signal received through the connector in case the determined folding angle falls within a second angle range; and
displaying a user interface corresponding to a user input on the display in response to the input signal.

14. The operation method of claim 13, wherein the second angle range comprises a first hysteresis range and a second hysteresis range, and
the operation method comprises:
blocking an input signal received through the connector in case the folding angle increases in the first hysteresis range;
obtaining the input signal in case the folding angle decreases in the first hysteresis range;
obtaining an input signal received through the connector in case the folding angle increases in the second hysteresis range; and
blocking the input signal in case the folding angle decreases in the second hysteresis range.

15. The operation method of claim 11, comprising blocking an input signal received through the connector in case the folding angle falls within a third angle range.

16. An electronic device comprising:
a motion sensor configured to detect motion of the electronic device;
a coupling device for coupling the electronic device to an external device so that the external device is rotatable with respect to the electronic device;
a connector connected to the external device for communicating a signal with respect to the external device as the electronic device is coupled to the external device; and
a processor operatively connected to the motion sensor and the connector and configured to:
obtain first motion data on motion of the electronic device through the motion sensor;
obtain second motion data on motion of the external device through the connector;
determine a folding angle between the electronic device and the external device based on the first and second motion data; and
determine an input mode for setting whether to display a user interface and/or whether to block an input signal received through the connector based on the determined folding angle.

17. The electronic device of claim 16, wherein:
the processor is configured to block an input signal received through the connector without displaying a user interface in case the determined folding angle falls within a first angle range,
the processor is configured to obtain an input signal received through the connector in case the folding angle falls within a second angle range and to display a user interface corresponding to a user input in response to the input signal,
the processor is configured to block an input signal received through the connector in case the folding angle falls within a third angle range.

18. The electronic device of claim 17, wherein the second angle range comprises a first hysteresis range and a second hysteresis range,
an input signal received through the connector is blocked in case the folding angle increases in the first hysteresis range and the input signal is obtained in case the folding angle decreases, and
an input signal received through the connector is obtained in case the folding angle increases in the second hysteresis range and the input signal is blocked in case the folding angle decreases.

19. The electronic device of claim 16, wherein the connector comprises a POGO connector.

20. The electronic device of claim 16, wherein the processor is configured to determine the folding angle based on the first motion data having a first scan period and the second motion data having a second scan period longer than the first scan period.

* * * * *